March 17, 1953 W. KOENIG, JR 2,632,057

SIGNAL TRANSMISSION

Filed April 12, 1944 4 Sheets-Sheet 1

INVENTOR
W. KOENIG, JR.
BY
H. A. Burgess
ATTORNEY

March 17, 1953 W. KOENIG, JR 2,632,057

SIGNAL TRANSMISSION

Filed April 12, 1944 4 Sheets-Sheet 2

INVENTOR
W. KOENIG, JR.
BY
H. A. Burgess
ATTORNEY

SIGNAL TRANSMISSION

Filed April 12, 1944 4 Sheets-Sheet 3

INVENTOR
W. KOENIG, JR.
BY H. A. Burgess
ATTORNEY

INVENTOR
W. KOENIG, JR.
BY
[signature]
ATTORNEY

Patented Mar. 17, 1953

2,632,057

UNITED STATES PATENT OFFICE 2,632,057

SIGNAL TRANSMISSION

Walter Koenig, Jr., Clifton, N. J., assignor to Bell Telephone Laboratories, Incorporated, New York, N. Y., a corporation of New York Application April 12, 1944, Serial No. 530,685

11 Claims. (Cl. 179—1.5)

The present invention relates to transmission of messages such as speech or similar types of signal with privacy.

An object is to secure a high degree of privacy or secrecy with simple and reliable type of circuits and apparatus.

The invention relates to the type of transmission in which the signal has is frequency and time components altered beyond recognition before the signal is sent out, the type of alteration being completely reversible so that the signal can be recovered at the receiver with minimum loss of intelligibility, by authorized persons. After the transformations have been made in the signal prior to its transmission, the signal can be sent over any ordinary channel such as line wire, carrier or radio channel.

The invention will be disclosed in connection with speech transmission but it is to be understood that other signals having appreciable band widths so that they can be divided into component frequency bands can be sent by the methods of the invention.

When speech waves are subdivided as to frequency into a number of narrow bands, such as five, and these bands are interchanged so that instead of their normal occurrence in the order 1, 2, 3, 4, 5 in ascending frequency order they appear in some other order such as 5, 1, 3, 4, 2, for illustration, the speech can be considered as having undergone a scramble in one "dimension" or characteristic, namely, frequency.

When the speech is subdivided as to time so that portions of speech, a small fraction of a second long, are changed in time order from their normal order of occurrence and become *c*, *a*, *e*, *b*, *d*, *h*, etc. instead of *a*, *b*, *c*, *d*, etc., the speech can be considered as having undergone a scramble in a different "dimension" or characteristic, namely, time.

The present invention is concerned with so-called "two-dimensional" scrambles in which the speech or signal undergoes scrambles in each of the two "dimensions," or characteristics, of frequency and time. This does not occur by merely placing a frequency scrambler and a time division scrambler in tandem with each other, for then all frequency components occurring within a given time are shifted together into another time interval while retaining their frequency order. In the two-dimensional scramble provision is made for the subbands of the fragment of speech which normally occurs in a particular time division to appear separately in different time intervals and in a scrambled frequency relation. To indicate such a scramble by numbers and letters a two-digit notation is necessary, such as 5*d*, 1*c*, 3*f*, 4*e*, 2*b*, meaning that the frequency components that were present in speech during time interval *a* in the order 1, 2, 3, 4, 5 are shifted in frequency into the order indicated by the number sequence and also these frequency components are individually shifted out of time interval *a* into other time intervals, namely band 1 into interval *c*, band 2 into interval *b*, band 3 into interval *f*, band 4 into interval *e*, and band 5 into interval *d*, for illustration. Their original places are then filled in by elements from other time and frequency intervals.

In order to provide this kind of two-dimensional scramble, it is necessary to shift the subbands in time individually, and, of course, to interchange the frequency positions of the subbands among themselves. In order to provide for varying both the time scramble and frequency scramble so that, for example, a particular frequency of subband is not always associated with a particular time shift, one may make either two successive frequency scrambles with an intermediate time scramble or two successive time scrambles with an intermediate frequency scramble. The invention contemplates both ways of effecting a two-dimensional scramble and further contemplates varying the scrambles either continuously or from time to time to secure the advantages of a changing code.

The nature and objects of the invention together with its various features will be more apparent from the following detailed description of illustrative embodiments shown in schematic circuit diagrams on the attached drawing in which.

Figure 1:
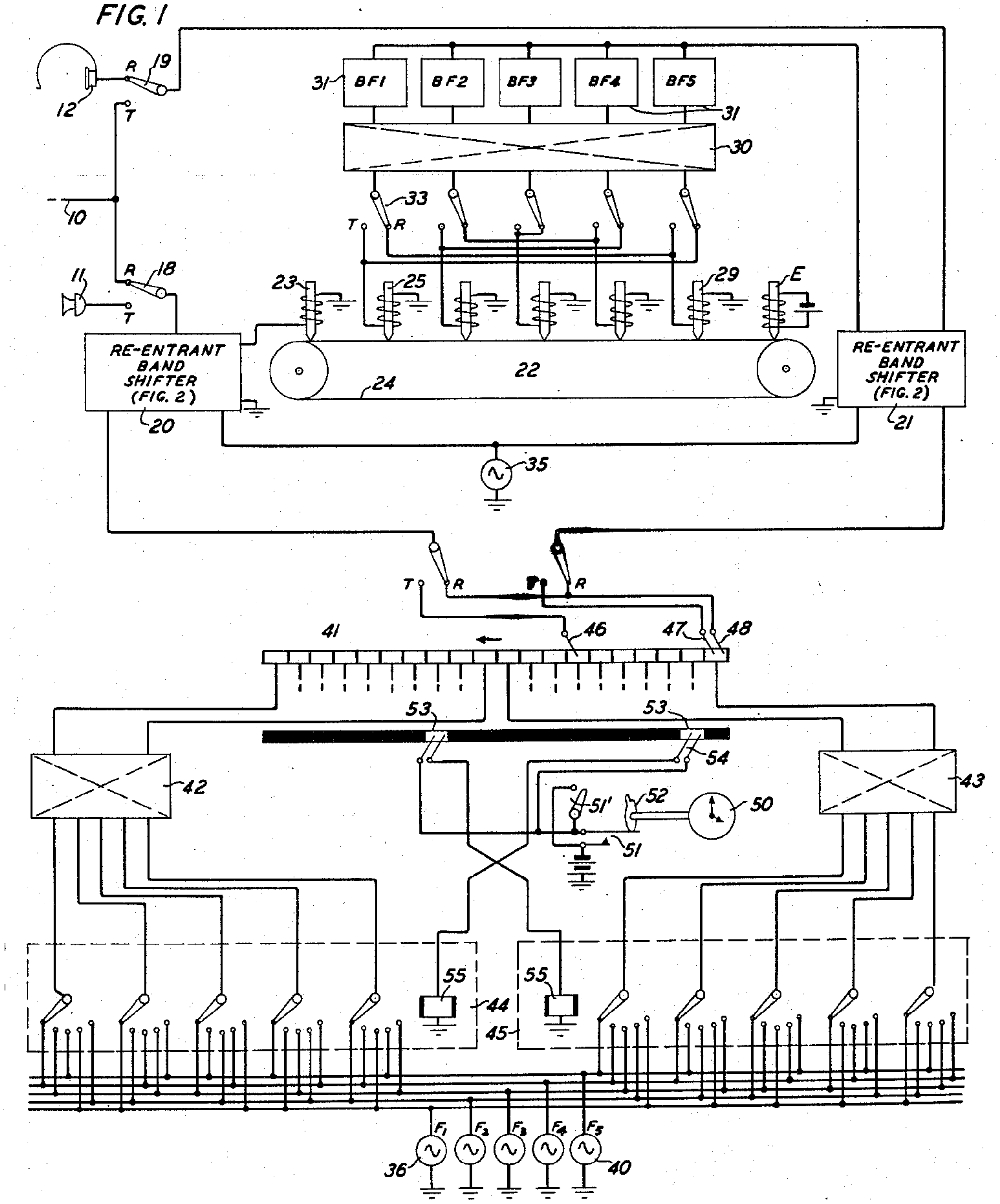
Fig. 1 shows a two-way terminal using two frequency scrambles and one time scramble.

Referring to Fig. 1, the line, transmitter and receiver branches are shown for simplicity as single line paths on the drawing, the line being indicated at 10, transmitter at 11 and receiver at 12, these elements being shown symbolically. In order to permit two-way operation, it is assumed that a button or key would be provided (not shown) in accordance with common practice which would be pressed or closed when the user is talking and released when he is listening, such systems being known as push-to-talk systems. A number of two-position switches are indicated, which would all be thrown together under control of such button from the normal receive (R) position to the transmit (T) position when the button is pressed and would be released to the R position when the button is released. Two of these are shown at 18 and 19 for determining connection between the transmitter 11 and line 10, and between receiver 12 and line 10, or respectively between the transmitter and receiver and either of the two reentrant band shifters 20 and 21. Others of these switches are shown at other points in the system.

The nature of these band shifting circuits will be described later in connection with Fig. 2 but it can be stated that their purpose is to receive at their input terminals a wave of speech band width such as a 250 to 3,000-cycle band and give out at their output terminals a wave of the same band, 250 to 3,000 cycles, but with the frequency order of the components within the band changed about among themselves. For instance, the highest frequencies are transferred to the lowest part of the band and all other frequencies raised in value, as one example. The two frequency scrambles referred to in the above discussion are accomplished in these two shifting circuits 20 and 21.

The time scramble is effected by the telegraphone tape mechanism 22 consisting of a recording coil 23 for tape 24 followed at equally spaced distances by reproducer coils 25 to 29 and finally by erasing coil E. The leads from coils 25 to 29 pass through an interconnecting panel 30 to individual band-pass filters 31 each selective of a narrow band of component speech waves. On the basis of a 2,750-cycle band, each of these filters would have a 550-cycle pass band, the pass bands being contiguous and together covering the 2,750-cycle band. Certain of the leads from coils 25 to 29 pass through T–R switches 33. The five separate bands from filters 31 are impressed on the input of reentrant band shifter 21.

Each of the band shifters 20 and 21 is supplied with two frequencies, one a fixed frequency F from oscillator 35 and the other any one of five different frequencies $F_1$ to $F_5$ derived from oscillators 36 to 40 shown in the lower part of the figure. These latter oscillators are arranged to be connected one at a time to the band shifters under control of the rotary distributor 41 having three brushes traveling over a segmented ring shown developed in this figure. The brushes travel to the left in the direction of the arrow. The code boxes 42, 43 and the sets of selector switches 44, 45 remain unchanged for considerable periods of time and for the present will be disregarded. The distributor brushes are driven from the same source that drives the tape 24 and the time taken by a brush to traverse one segment is the same as the time taken by a point on the tape to travel from one coil to the next.

The operation of the Fig. 1 circuit will now be described. In transmitting, all T–R switches are thrown to the T-position. Speech from 11 passes into the band shifter 20 where the first frequency scramble is made. This results from the application of one of the $F_1$ to $F_5$ frequencies which are so chosen that the speech band is divided at some frequency corresponding to the band limits of the filters 31, such as at 800, 1,350, etc. cycles, so that one, two, three or four of the 550-cycle bands lie on one side of the dividing line frequency and the remaining four, three, two or one bands lie on the opposite side. Those bands lying to one side are at the same time shifted to appear on the other side of the remaining bands and all bands are shifted to reoccupy the original total band limits. The effect of this is to interchange the "potential" bands among themselves, these bands being referred to as potential since they are not divided into bands until they reach the filters 31.

The frequency scrambled speech wave from band shifter 20 is applied to coil 23 for recording on the tape. After one or more time intervals of delay depending upon the connections in box 30, the lowest frequency band (250 to 800 cycles) is selected by filter BF–1 and sent to band shifter 21. The next higher band is selected by filter BF–2 after a different number of units of delay and the next higher bands are selected after respectively other numbers of units of delay by the band filters BF–3, BF–4 and BF–5. Except for the initial part of a speech message and also the final part, all five filters 31 are continuously transmitting subbands to the band shifter 21. This band shifter behaves like band shifter 20 and rearranges the subbands of the input wave within the same total band limits. A two-dimensional scramble exists in the summation wave in the output of filters 31 but the scramble is limited because of the fact that certain delays are tied up with certain subbands of the frequency scrambled wave from 20. Use of the second band shifter 21 allows a complete two-dimensional scramble in which any subband of the original speech can be shifted in frequency to any other frequency position and in time to any other time order with respect to the remaining subbands. The output scrambled waves from reentrant band shifter 21 are sent over switch 19 in its T position into line 10 for transmission to the distant station.

The distributor permits a different shifting frequency to be applied to the band shifters for each successive time interval represented by the travel time between coils on the tape 24. The order of application of these five frequencies is determined by the wiring between oscillators 36 to 40 and the commutator segments including the connections made in code boxes 42 and 43 and by selector switches 44 and 45. These latter switches are caused to step in unison from one contact to the next under control of clock 50, and the bank terminals are connected in irregular order to buses leading to the generators 36 to 40. One way of causing the switches to step at the same time at all stations without placing too strict requirements on the accuracy of the clocks is to have each clock close enablying contacts 51 by cam 52 and provide timing segments 53 and actuating brushes 54 on the main distributor for closing circuits through respective groups of stepping magnets 55 of the two multi-arc switches, each group being stepped when the brushes 46, 47 and 48 are on the opposite half of the distributor 41. For illustration, the switches may be stepped once every 10 seconds. The cross-connections between input and output terminals in each of the boxes 42, 43 may be made by hand or by means of perforated cards or tapes once or twice a day or at other suitable intervals, by way of illustration. By closing switch 51', the switches 44 and 45 are stepped every revolution of the distributor instead of at times determined by the clock.

The two transmitting brushes 46 and 47 are shown separated by six commutator segments so that the same frequency $F_1$ to $F_5$ is applied to band shifter 21 that was applied to band shifter 20 six time elements previously. This delay of six time units in the application of this shifting frequency can be introduced either when transmitting or when receiving. Alternatively to the construction shown, therefore, there might be two receiving brushes and one transmitting brush, with one receiving brush lagging the other by six segments.

To receive, all T–R switches must be in the R position. The line 10 is connected to the input of band shifter 20 while receiver 12 is connected to the output of band shifter 21. Receiving brush 48 applies one of the five shifting frequencies $F_1$ to $F_5$ to both band shifters 20, 21. The frequency so applied is the same as that used at the distant transmitting station at the same time for the band shifter 21 thereat, since it must be assumed that all parts move in synchronism at both stations and that the brushes are in the same positions at both stations except as the receiving brush may need to be slightly retarded to compensate for transmission path delay. The operation of the band shifters is such that application of the same frequency will produce complementary shifts in the bands so that the first band shifting operation at the receiver unscrambles the second frequency scramble made at the transmitter. Except for transmission path delay these two operations occur at the same time at the two stations and for this reason the receiving brush is shown on the same segment as the lagging transmitter brush. It will be seen from the drawing that the segment on which the receiving brush and the lagging transmitter brush rest is also the same segment over which the leading transmitter brush passed six time units earlier. The frequency supplied to both band shifters in the receiver is, therefore, the frequency that was used at the transmitter six time units earlier to make the first frequency scramble for those speech elements which are now entering the second band shifter at the receiver (shifter 21).

This is true because all speech elements undergo a total delay in both tape machines together of six units. If a given speech element is delayed five units (the maximum) at the transmitter, it is delayed the minimum amount of one unit at the receiver, this one unit being required in order to record the speech element at 23 and reproduce it at the first coil 25. A delay of three units at the transmitter is followed by a delay of three units at the receiver, and so on for the other delays, all of which must total six units. This is accomplished by the T–R switches 33 which interchange the leads from the first and fifth coils and those from the second and fourth coils in going from transmitting to receiving condition. It follows from this that the five superposed bands which at any given moment are applied to the second band shifter (21) at the receiver were all passing through the first band shifter at the transmitter six time units earlier, even though the speech elements now found in these five sub-bands at the instant in question actually arrived at the receiver at various times in the intervening six-unit time interval. Regardless of the time in which each such element arrived, as noted above, it underwent the correct shift in the first band shifter (20) at the receiver since at the time of its arrival the same frequency was applied to this band shifter and to the transmitting second band shifter. By spacing the brushes in this manner, therefore, the proper frequency shifts are made at the receiver to undo the two frequency scrambles at the transmitter.

Since the received wave has now undergone two frequency scrambles and one time scramble as described, the speech is restored to normal form and is heard in receiver 12.

Figure 2:
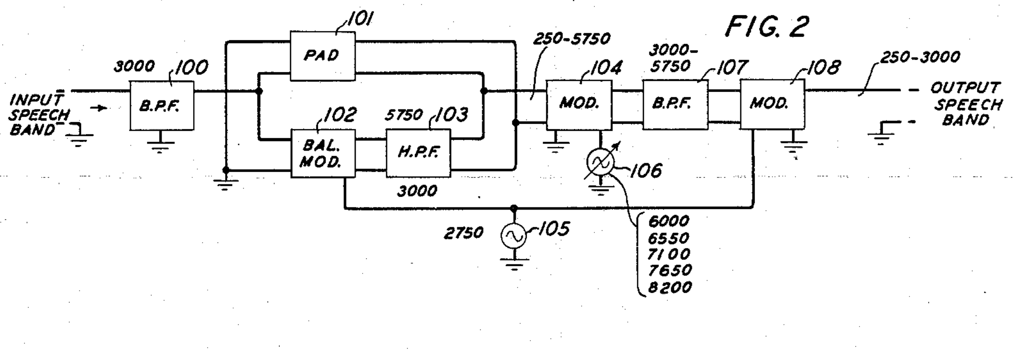
Fig. 2 shows a form of reentrant band shifting circuit suitable for use in the systems of the other figures.
Figure 2A:
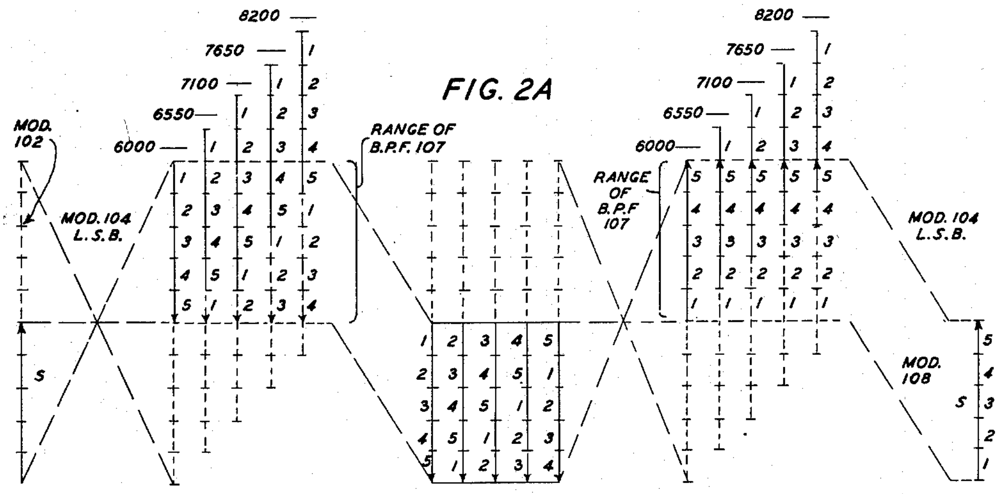
Fig. 2A is a diagram illustrating frequency shifts employed in carrying out the invention.

Referring to Figs. 2 and 2A, the reentrant band shifter will now be described. In the form shown this comprises band filter 100 for trimming the input speech band to some suitable band that is to be used, such as 250 to 3,000 cycles, these values being given for illustration. It is further assumed, for purposes of illustration, that the scrambling circuits shown in the other figures are such as to divide this range into five equal parts, band one extending from 250 to 800 cycles, band two from 800 to 1,350 cycles, band three from 1,350 to 1,900 cycles, band four from 1,900 to 2,450 cycles and band five from 2,450 to 3,000 cycles. While the reentrant band shifter described in Fig. 2 does not do any subdividing of the total speech band, it is arranged to shift the band as a whole by an amount corresponding to one, two or more times the width of one of these bands for the purpose of rearranging the bands within the total frequency range. The input waves to the band filter 100 may comprise normal speech or scrambled speech.

The output of band filter 100 is transmitted through two paths in parallel, the upper path containing a linear pad 101 and the lower path containing a balanced modulator 102 and a high-pass filter 103. Pad 101 has such loss as to deliver the output from filter 100 to the input of modulator 104 at the same level as the modulated waves in the output of filter 103. These latter waves occupy the range from 3,000 to 5,750 cycles as a result of modulating the input band in modulator 102 with waves from oscillator 105 having a frequency of 2,750 cycles. The band selected by filter 103 is seen to be the upper side-band resulting from this modulation. As a result of the action of this modulator and pad 101, there is delivered to the input of modulator 104 a continuous band extending from 250 to 5,750 cycles representing two superposed speech waves. Considering the five subbands which each of these two superposed speech bands comprises, there are ten subbands applied to the input of modulator 104, these being in the order of ascending frequency, bands one to five occupying their normal frequency position and these same bands one to five duplicated at frequencies respectively displaced 2,750 cycles above the five bands of lower frequency.

Modulator 104 is indicated as supplied with different frequencies from oscillator 106 in some manner such as indicated in the other circuit figures. For illustration, this oscillator at different times and under different conditions may have any one of the five frequencies indicated adjacent it in the drawing. Band-pass filter 107 passes the range 3,000 to 5,750 cycles which is seen to be a portion of the lower side-band of the modulated waves produced in modulator 104, this portion having a width of 2,750 cycles. This band which passes through filter 107 is demodulated in modulator 108 by some of the original 2,750-cycle wave from oscillator 105 so that the band is stepped downward in frequency to occupy the band limits 250 to 3,000 cycles. This is the output wave and it is seen to occupy the same band limits as are defined by the input band filter 100.

Reference to Fig. 2A will show that the application to modulator 104 of any one of the five frequencies designated will produce in the lower side-band output of modulator 104 a given scramble of input normal speech (in one case there is no scramble) and will unscramble this same scramble and give normal output speech if the scrambled wave is applied to the input.

Referring to Fig. 2A, the arrow S is shown pointing upward, indicating normal (rather than inverted) speech composed of five subbands as indicated. Due to the action of modulator 102 the same speech band appears immediately above S on the frequency scale. By means of modulator 104, this double speech band can be shifted in frequency and the lower side-band is in part indicated by L. S. B. and is shown in different stepped frequency positions with the successive bands in each case numbered from top to bottom and with the arrow pointing downwards indicating frequency inversion. The first of the indicated waves referred to is the wave that would be obtained by applying a wave of 6,000 cycles to the modulator 104. If instead a frequency of 6,550 cycles were applied to the modulator 104, the absolute frequency limits occupied by the bands one to five in the lower side-band based on 6,000-cycle modulating frequency are now occupied by bands two, three, four, five and one, the last-mentioned band coming from the superposed speech wave resulting from the action of modulator 102. Band filter 107 has a pass band, such as will pass the last enumerated series of subbands based on the assumed modulating frequency of 6,550. In similar manner, if a frequency of 7,100 cycles is applied to modulator 104, the lower side-band obtained is elevated in absolute frequency by just the right amount to let subbands three, four, five, one and two in that order pass through filter 107. Reference to the diagram will show that any displacement of the five subbands is obtainable so that, for example, band five can appear in any one of five positions with respect to the remaining bands, the same thing being true of each of the other bands.

The middle portion of Fig. 2A shows the result of selecting any one of the four scrambled waves or the one unscrambled wave by band filter 107 and demodulating them to the normal speech level. These are the types of scrambles which would appear, for example, in the output circuit of the band shifter as a result of applying normal speech in the input. When a wave of any one of these five types is applied to the input, conversely, and is modulated in modulator 104 by the same frequency of wave that was used in producing the scramble, it is seen that normal speech results, as shown at S at the extreme right of the figure in the demodulated output. This may be seen by following through the modulation steps. First, a duplicate band is produced just above the input band on the frequency scale due to modulator 102. As the inverted scrambled bands are shifted upward in frequency by modulator 104 the lower side-band has a normal instead of an inverted frequency. If the wave is of the type indicated by the next to the extreme left arrow in the middle portion of the figure, and if a wave of 6,550 cycles is applied to modulator 104, it is seen that the portion of the resulting lower side-band which will pass through filter 107 comprises subbands one to five in normal ascending order. The same is true of each of the other types of scramble indicated when modulated by the proper shifting frequency. When these bands are stepped downward by modulator 108, they are placed in the speech range of 250 to 3,000 cycles.

This type of band shifter affords simplification in the design of the system since complementary frequencies do not need to be supplied for respectively scrambling and unscrambling but rather the same frequency can be used at both ends of the system for scrambling and unscrambling. This reentrant band shifter in and of itself forms no part of the present invention.

The values of frequencies given for illustration impose strict balance requirements upon the modulator 104 to prevent direct transmission of input waves into its output. Higher modulating frequencies could be used for oscillator 106 to prevent overlap in frequency between input and output side-band waves. In such cases a different oscillator frequency for the modulator 108 would be necessary in order to step the frequency band from filter 107 down to speech level.

Figure 3:
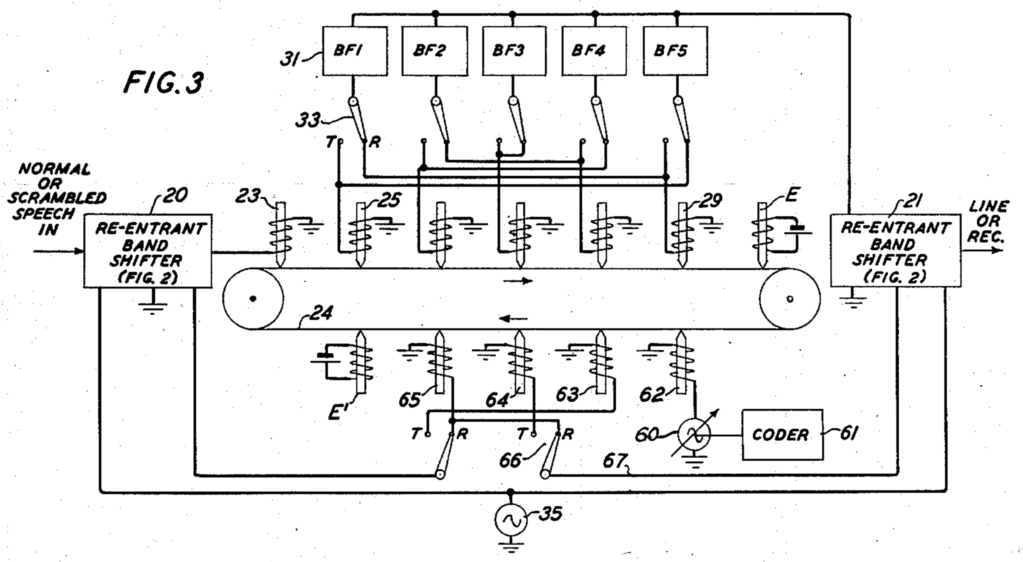
Fig. 3 shows a modified two-way terminal of the general type shown in Fig. 1.

Fig. 3 differs from Fig. 1 principally in the manner in which the six units of delay are introduced between applications of the shifting frequency to the band shifters 20 and 21. As in the case of Fig. 1 it is assumed that this delay is introduced at the transmitter although it could alternatively be introduced at the receiver, if desired.

In place of using a leading and lagging brush on the distributor, Fig. 3 shows use of the tape 24 and recording and reproducing coils 62 and 65 for effecting the delay. Since the message is erased at E the lower part of the tape can be used for this purpose and can again be prepared for the message by providing erase coil E'.

With T–R switch 66 in T position, the shifting wave for band shifter 20 is derived from coil 63 and the shifting frequency for the band shifter 21 is derived from coil 64 after six units of delay. When the T–R switch 66 is in R position, the frequency to be applied to both band shifters is derived from coil 65 which is shown slightly lagging coil 64 to indicate compensation for path delay. If there is no path delay, coil 65 is to be considered as reproducing the same frequency as coil 64 and in fact the single coil 64 could in that case be used by wiring it to connect permanently to lead 67, eliminating the necessity of the right-hand switch of the pair of T–R switches 66. It is to be understood that the coils 62 to 65 would ordinarily have unequal spacing along the tape and they are to be given in any case such relative locations as to effect the required delays for that case.

In this figure for simplicity of showing, the various frequencies for the band shifting are all derived from one variable frequency oscillator 60 which has its frequency shifted to any one of five discrete frequencies under control of a coder 61. This can contain timing mechanism as in Fig. 1 for, in this case, switching in different tuning condensers into the oscillator as will be shown in Fig. 4 or the oscillator 60 can be considered as five separate oscillators as in Fig. 1. The output of the oscillator is recorded at 62.

The operation of this circuit is the same as that of Fig. 1, the proper shifting frequencies being supplied for both transmitting and receiving in this case by the use of the two spaced reproducers 63 and 64 instead of the spaced brushes.

Figure 4:
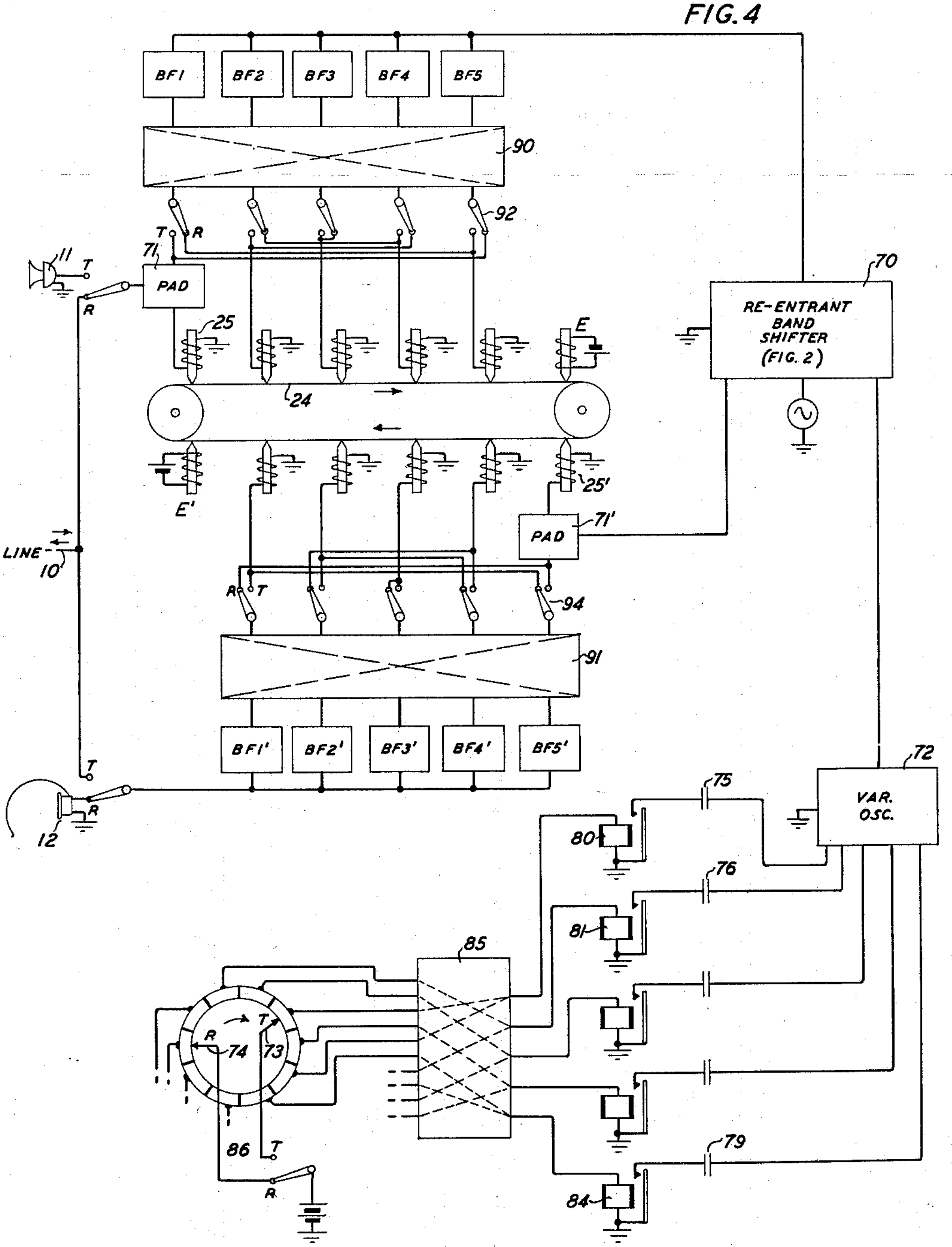
Fig. 4 shows a two-way terminal using two time scrambles and one frequency scramble.

Referring to Fig. 4, the upper half of the tape 24 is used for effecting a first time scramble in the message and the lower half is used for effecting a second time scramble with a single reentrant band shifter 70 interposed. The upper set of band filters and coils may be as in Fig. 1 but in this case, for illustration, the necessity of one unit delay in recording is avoided by causing the recording to take place simultaneously with transmission or reception. This is done by use of pad 71 which is merely a branched connection from the input lead to both the band filter BF-1 and coil 25 with enough impedance to match the incoming circuit to each branch. A similar provision is made in the case of pad 71′ and coil 25′.

Since only one band shifter is used, only one shifting frequency need be supplied by variable oscillator 72 so that only a single transmitting brush 73 is needed. The receiving brush 74 lags four time units behind the transmitting brush. The variable oscillator 72 is shown provided with five different tuning condensers 75 to 79 each of which when connected to ground by the corresponding relays 80 to 84 causes the oscillator to generate a particular frequency, these frequencies differing from each other in steps of 550 cycles on the basis of a 250 to 3,000-cycle speech band. It will be understood that only one relay is operated at a time and the particular relay operated depends on the wiring to the commutator segments, which can be changed from time to time by means of interconnecting panel 85. This panel has ten terminals facing the distributor and five terminals facing the relays so that within the panel each of the five relay terminals must be cross-connected to two of the opposite terminals preferably in some irregular order. As either brush may have battery on it depending on the position of T-R switch 86, a different relay is operated each time the brush in use passes off one segment onto the next.

T-R switches 92 and 94 are shown for changing interconnections between the reproducer coils and the selecting filters, and cross-connecting panels 90 and 91 are shown for permitting manual changes to be made in the wiring from time to time according to some schedule.

In the operation of this system, in transmitting, all T-R switches are thrown to T-position and speech is recorded at 25 on the upper portion of the tape 24 where a time scramble is made in the various subbands. One subband is in this case selected with on delay since some one of the band filters BF-1 to BF-5 will be connected through panel 90 directly to pad 71 and will have the speech band applied to it without delay. The speech is applied to each of the other filters with from one to four units of delay. These bands are scrambled as to frequency by band shifter 70 and recorded at 25′ on the lower part of the tape 24. As a result, a second time scramble is made in the five subbands by delaying each band either zero, one, two, three or four time units. These five subbands are then sent out over the line 10 which may be a telephone line or radio or carrier channel.

Except for a brief instance at the beginning and end of a speech wave all five band filters BF-1 to BF-5 are impressing waves on the band shifter 70 at the same time so that the five subbands are displaced in frequency simultaneously under control of the wave applied from variable oscillator 72. The timing of the commutator 86 is such that oscillator 72 applies a different frequency to the band shifter 70 at the beginning of each new time unit as measured by the time taken for a point on the tape to travel from one coil to the next. Distributor 86 has the effect of dividing the subbands into fragments of unit length and changing the shifting frequency for each fragment of the subdivided speech.

In receiving, the T-R switches are released to R-position and the incoming scrambled speech is recorded at 25. First a time scramble the reverse of the second time scramble made at the transmitter, is produced due to the changes in connections made under control of the T-R switch 92 (the connections in boxes 90 and 91 remaining unchanged throughout the sending of any given speech message). If the last delay at the transmitter for a given band was one unit, three units delay are introduced into this band at the receiver, all bands being delayed a total of four units in these two time scrambles.

Since the receiving brush 74 is lagging the transmitting brush of the distant station by four time units, the proper frequency will be supplied to the band shifter 70 to unscramble the frequency scramble that was made at the transmitter four time units earlier in each particular five bands coming out of the filters BF-1 to BF-5 at any time. This restores the bands to the condition in which they were after the first time scramble at the transmitter. They are restored to normal speech by the second time scramble at the receiver, the T-R switches 94 causing the delays introduced to be complementary to those introduced in the first time scramble at the transmitter. It thus requires three steps to restore the speech to normal.

Figure 5:
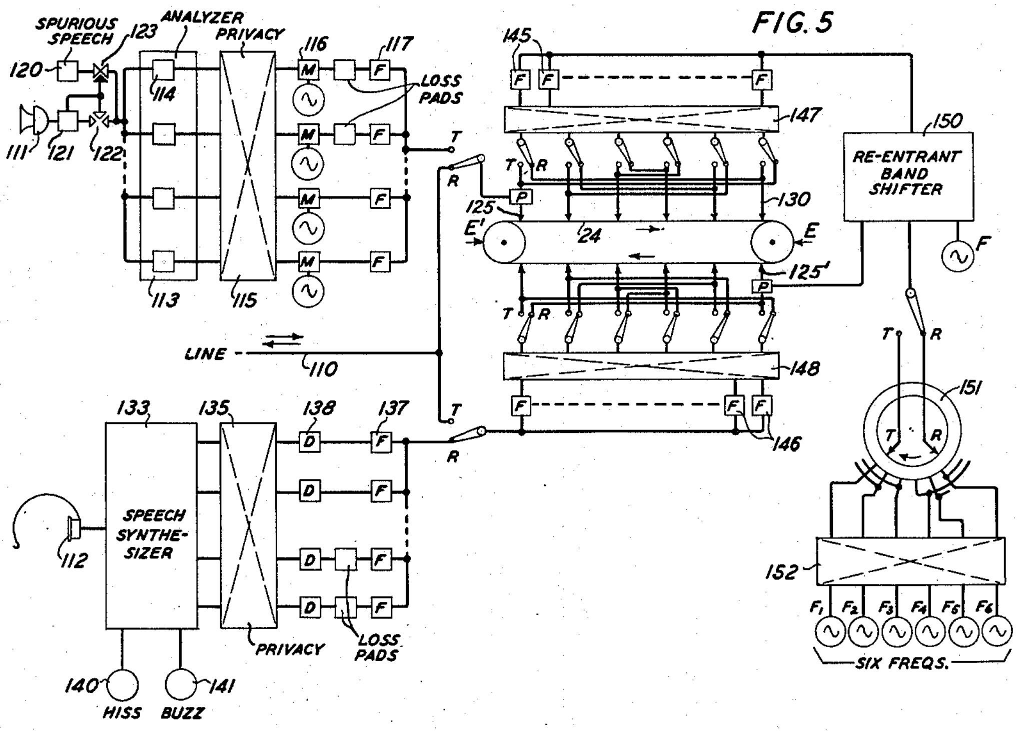
Fig. 5 shows a two-way terminal of the Fig. 4 type for a coded speech type of signal.

Referring to Fig. 5, this figure is, in general, similar to Fig. 4 except for the type of signal that is transmitted through the system. In this case it is assumed that the signal is composed of coded speech such as would be obtained by use of a vocoder, an example of which is disclosed in Dudley Patent 2,151,091, issued March 21, 1939. In this instance, the vocoder is shown as comprising in the transmitting branch an analyzer 113 and in the receiving branch a synthesizer 133. Complementary privacy devices in the transmitter and receiver are shown at 115 and 135, respectively. These privacy devices may vary to suit conditions. It will be assumed for illustration that the speech is analyzed at 113 into twelve different components in twelve different circuits, certain of these components representing the pitch variations of the speaker's voice and other components representing the spectrum or frequency energy distribution. The privacy devices may consist simply of permutation switches for interchanging these twelve channels among themselves from time to time. In order to enable all twelve of the signal channels into which the speech has been analyzed to be transmitted over a single circuit, multiplex carrier apparatus is shown in the form of modulators 116 supplied with suitable carrier frequencies and channel band filters 117, all in accordance with known practice. Similarly, at the receiver separating band filters 137 are used followed by detectors 138 for recovering the individual channel currents and impressing them upon the privacy 135. The synthesizer operates in the manner indicated in the Dudley patent to build up the speech currents from a source of "hiss" currents 140 and a source of "buzz" currents 141.

Referring to the time scramble and reentrant band shifter, these may be the same as in Fig. 4 except that in this case the subdividing filters shown at 145 are twelve in number and there are six coils 125 to 130, inclusive, cooperating with the tape 24 in the first or upper time scrambler. Similarly, in the second or lower time scrambler, there are six coils and there are twelve subdividing filters 146. The interconnecting panels 147 and 148 provide for variably connecting the coils to the filters in each case and since there are six coils and twelve filters in each case each coil must be connected to two of the filters, preferably in some irregular order.

The reentrant band shifter 150 may be the same as in Fig. 4 but is in this case supplied with six frequencies $F_1$ to $F_6$ through a suitable distributor 151 having a transmitting brush and a receiving brush lagging five segments behind the transmitting brush. An interconnecting panel at 152 permits permutations to be made in the connections between the generators $F_1$ to $F_6$ and the leads that are connected to the distributor segments. T–R switches are shown at various points in the system. If desired, more than six shifting frequencies can be used, for example twelve. With six shifting frequencies the total band is shifted in frequency steps having widths equivalent to the frequency space occupied by two adjacent carrier channels so that the channels may be thought of as being shifted in pairs. If only four shifting frequencies were used, the channels would be shifted in sets of three.

In the operation of this system, assuming for the moment that contacts 122 adjacent the transmitter 111 are closed, the speech currents from transmitter 111 are analyzed into component bands in the analyzer by devices 114 each of which comprises a subdividing filter and integrator so that the component bands are reduced to direct currents varying in amplitude at frequencies of the order of syllabic frequencies. The pitch variations are similarly translated into slowly varying direct current. These are passed through the privacy 115 and the emerging currents are translated into modulated carrier currents which may embrace a total band width of the order of 3 kilocycles. The channel filters 117 select one side-band of each modulation and these side-band currents are transmitted together to the recording coil 125, one of the carrier channels being also at the same time impressed through the connected dividing filter 145 to the reentrant band shifter 150. The other channel side-bands are variously delayed before being impressed on the band shifter. After undergoing a frequency shift at 150 in a manner described in connection with the other figures, the twelve channel side-bands are again recorded in coil 125' and the second time scramble is made, after which the twelve channel bands are selected at 146 for transmission over the line or radio channel 110.

Received currents from a similar transmitting station are received over channel 110 and (with the T–R switches in the R position) are put through the time scrambling and frequency scrambling apparatus and impressed upon the receiving channel filters 137 where they are separated into the various channels, detected at 138 and impressed on the receiving privacy 135. From this they pass into the speech synthesizer and control the reconstructing process whereby understandable speech is produced in receiver 112.

Various adjuncts may be incorporated to further disguise the type of signal being transmitted, two such devices being indicated as will now be described. The first of these adjuncts comprises the use of loss pads in one half of the transmitting vocoder channels as shown in the upper two channels of the transmitter for attenuating the currents in these channels by a definite amount, such as 3 decibels. In order to compensate for this change, corresponding pads are included in the other half of the channels at the receiving point as indicated in the lower two channels in the receiving side.

The second adjunct comprises means for applying spurious speech to the transmitter when the talker is not talking. Such a spurious speech source is indicated at 120 and may, for example, be a phonograph. A voice operated switch 121 is included in the circuit of the microphone 111 constructed in known manner to respond to talkers' speech currents and immediately close normally opened contacts 122 and at the same time open normally closed contacts 123 as indicated functionally in this diagram by the well-known convention of arrow heads. The device 121 may include a sufficient amount of delay to insure that the contacts 122 and 123 are fully operated before the speech currents reach contacts 122 to minimize clipping. Devices serving the functions indicated for elements 121, 122 and 123 are well known in the art in connection with antisinging devices and echo suppressors. The spurious speech can effectively mask the signals against attempts to break the privacy, without preventing successful reception of the message by the suitably equipped receiver.

A vocoder for transforming the speech waves into vocoder channel currents prior to transmission and for converting the received vocoder channel currents into understandable speech can equally well be used with the type of privacy involving two band shifters with an interposed time scrambler in the general manner disclosed, for example, in Figs. 1 and 3 in a manner which is believed to be obvious from the description given of Fig. 5.

In each of the figures, for simplicity of showing, the number of coils on the tape has been no greater than the number of band filters. Greater secrecy could be obtained by using a greater number of coils, such as nine instead of five assuming five analyzer filters. In this case nine leads would enter the panel 30 of Fig. 1 and similar panels of the other figures and it would be preferable to place the T–R switches on the same side of these panels as the band filters so as still to be able to use five T–R switches.

The invention is not to be construed as limited to the specific circuits and apparatus shown for illustration of the various forms of embodiment but the scope of the invention is defined by the claims.

What is claimed is:

1. A circuit for producing a scramble of a signal wave in frequency and a scramble of the same wave in time comprising means for producing variable amounts of time delay in the signal wave as a whole, a plurality of subdividing filters connected to said means for separating different subbands having respectively increasing amounts of delay, and means for interchanging the frequency position of said subbands to place them in abnormal frequency order.

2. In a privacy system, the combination of means to subdivide a signal wave band into subbands, means to delay respective subbands by different times to produce a scramble in the time dimension, and a reentrant frequency shifter operating to interchange the frequency order of the subbands among themselves in different ways depending upon application of a high frequency wave of particular frequency thereto to produce a scramble in the frequency dimension.

3. A privacy system having at a transmitting station and also at a receiving station the combination recited in claim 2 together with means at each station to supply high frequency waves of different frequency to the reentrant frequency shifter at the respective station from time to time in predetermined order to vary the character of the scramble in transmitting and to unscramble the signal in receiving, including means for delaying application of the high frequency wave at the receiver with respect to the transmitter by an amount to allow for the delay produced by the scramble in the time dimension.

4. The combination according to claim 2 including a further reentrant band shifter similar to the recited band shifter, one such band shifter coming ahead of said delaying means and the other band shifter coming after said delaying means.

5. The combination according to claim 2 including a further delaying means similar to the recited delaying means, one such delaying means coming ahead of said reentrant band shifter and the other delaying means coming after said reentrant band shifter.

6. In a speech privacy system, means for subdividing the speech frequency band into several subbands, means for variably delaying said subbands to produce in them relative displacements in time, means for variably shifting the frequency order of said delayed subbands within the same total band limits, means for variably delaying said shifted subbands to produce in them relative displacements in time, and means to transmit the resulting wave as a doubly-scrambled speech wave.

7. A circuit for producing a scramble of a signal wave in frequency and a scramble of the same wave in time comprising filters for subdividing the wave frequency band of said signal into component frequency bands, means to variably delay the different component bands to produce the time delay scramble, means to modulate all of the component band waves in common by any one of a number of high frequency waves to produce different frequency shifts in the signal band, a filter for selecting a group of subbands making up the signal but in various orders of occurrence depending upon the modulating high frequency wave, and means to shift the frequency position of the wave so selected to signal frequency level.

8. In a signal privacy system for signals comprised of a band of frequencies to be subdivided into a number of subbands, a band shifting circuit, means to impress said signal band of frequencies upon said band shifting circuit, said latter circuit shifting frequency components comprising certain subbands upwards in frequency and other frequency components comprising other subbands downward in frequency to interchange the frequency positions of the respective subbands, means to make a record of the wave resulting from the action of said band shifting circuit, a plurality of reproducers cooperating with said record to reproduce the recorded wave after different periods of delay and a band filter connected in circuit with each reproducer, each such filter having a different pass band such as to pass a different one of said subbands, and a common output circuit connected to all of said filters.

9. In a signal privacy system, means for making a record on a recording mechanism of a band of signal frequencies of signal band width, a succession of reproducers for picking up said band of recorded signal frequencies with successive amounts of delay, band filters having mutually exclusive pass bands each connected in circuit with a respective reproducer to separate the signal into subbands having different respective amounts of delay, a band frequency shifting circuit, and means to impress the separate subbands from said band filters upon said band frequency shifting circuit to displace the subbands with respect to one another in frequency.

10. In a privacy system, means at a transmitting station to subdivide a signal band into several subbands, means to produce different amounts of delay in the different subbands and a frequency shifting circuit for interchanging the frequency positions of the various subbands among themselves by modulation with waves of high frequencies, similar means at a receiving station for restoring the subbands to their normal frequency and time relations, and means at each station for supplying to the frequency shifting circuit thereat a series of high frequency waves of like frequency at both stations, the supplied wave at the receiving station being supplied at a later time than the corresponding wave at the transmitter to allow for the time delay introduced by said delay producing means.

11. A privacy system for multiplexed signal waves comprised of superposed bands of frequencies representing component wave transmission channels, said system comprising means to produce different amounts of time delay in said signal waves, filters having different pass bands for separating from the differently delayed waves various respective component channel waves to displace in time certain of said channel waves with respect to others, and a frequency shifting circuit operating to interchange the frequency positions of said differently delayed separated channel waves among themselves.

WALTER KOENIG, Jr.

REFERENCES CITED

The following references are of record in the file of this patent:

UNITED STATES PATENTS

| Number | Name | Date |
|---|---|---|
| 1,533,311 | Fletcher | Apr. 14, 1925 |
| 1,542,566 | Mathes | June 16, 1925 |
| 1,563,326 | Bown | Dec. 1, 1925 |